United States Patent [19]

Hoffmann et al.

[11] Patent Number: 4,802,689
[45] Date of Patent: Feb. 7, 1989

[54] SUSPENSION SYSTEM FOR RIGID VEHICLE AXLE

[75] Inventors: Friedrich Hoffmann, Schoenaich; Franz X. Scheller, Weinstadt, both of Fed. Rep. of Germany

[73] Assignee: Daimler-Benz Aktiengesellschaft, Stuttgart, Fed. Rep. of Germany

[21] Appl. No.: 895,332

[22] Filed: Oct. 22, 1986

Related U.S. Application Data

[63] Continuation-in-part of Ser. No. 757,939, Jul. 23, 1985, abandoned, and a continuation-in-part of Ser. No. 757,940, Jul. 23, 1985, abandoned.

[30] Foreign Application Priority Data

Jul. 31, 1984 [DE] Fed. Rep. of Germany ....... 3428160
Jul. 31, 1984 [DE] Fed. Rep. of Germany ....... 3428161

[51] Int. Cl.$^4$ ............................................... B60G 9/00
[52] U.S. Cl. ..................................... 280/688; 280/724
[58] Field of Search ............... 280/723, 725, 695, 700, 280/717, 701, 698, 724, 688; 267/57

[56] References Cited

U.S. PATENT DOCUMENTS

| 2,226,047 | 12/1940 | Burgward | 280/723 |
| 2,919,760 | 1/1960 | Fehlberg et al. | 180/73.1 |
| 2,954,835 | 8/1960 | Janeway | 280/724 |
| 3,006,429 | 10/1961 | Polhemus et al. | 280/703 |

FOREIGN PATENT DOCUMENTS

| 964928 | 6/1957 | Fed. Rep. of Germany . | |
| 1948908 | 6/1970 | Fed. Rep. of Germany | 280/688 |
| 2751997 | 4/1979 | Fed. Rep. of Germany . | |
| 3146605 | 12/1983 | Fed. Rep. of Germany . | |
| 1174803 | 3/1959 | France | 280/724 |
| 1273251 | 8/1961 | France | 280/724 |
| 1479822 | 9/1967 | France . | |
| 1550059 | 11/1968 | France . | |
| 2225301 | 6/1974 | France . | |
| 2509233 | 1/1983 | France . | |
| 898808 | 4/1962 | United Kingdom . | |
| 1548114 | 2/1979 | United Kingdom . | |

Primary Examiner—John J. Love
Assistant Examiner—Karin L. Ferriter
Attorney, Agent, or Firm—Barnes & Thornburg

[57] ABSTRACT

The invention relates to an axle suspension means for motor vehicles, wherein the guide means of a rigid axle is constructed so that the latter changes its position in the sense of a positive oblique springing during inward spring stroke movements, and executes no inherent steering movements during one-sided and alternate-side inward and outward spring strokes. For this purpose the rigid axle is guided on each side by a pair of guiding control arms which determine, for its wheel axis, a pivot axis about which the wheel axis is movable by means of a guide arm retained on the vehicle body in the sense of the positive oblique springing during inward spring stroke movements. Simultaneously, the two pairs of guiding control arms, each in common with a rocker arm mounted on the rigid axle pivotably about the pivot axis staggered vertically to its wheel axis, form straight guides guiding the pivot axis in a vertical plane during inward spring stroke movements, whereby inherent steering movements of the rigid axle are prevented.

12 Claims, 6 Drawing Sheets

SUSPENSION SYSTEM FOR RIGID VEHICLE AXLE

BACKGROUND AND SUMMARY OF THE INVENTION

This is a continuation-in-part of U.S. application Ser. Nos. 757,939 and 757,940, both filed July 23, 1985 and now abandoned.

The invention relates to an axle suspension system for motor vehicles, particularly motor cars, of the type having a rigid axle supported by non-guiding springs and guided by lateral guiding arms which determine a travel path for the rigid axle axis (wheel axis) in the sense of positive oblique springing with rearward and upward movement of the rigid axle axis during inward springing movements of the rigid axle. This application is a combination of Ser. No. 757,939 and the commonly assigned application Ser. No. 757,940 filed on even date herewith and based on German Patent Applications P 34 28 161.4 and 34 28 160.6 filed in Germany on July 31, 1984.

An axle suspension means of this general type is described in U.S. Pat. No. 2,226,047 (FIG. 5).

This axle suspension system presents the advantage of a positive oblique springing, in that, due to a lateral displacement of the wheel axis with respect to a straight line joining the points of articulation of the control arms to the rigid axle, the wheels can move upwards and backwards about a pivot axis parallel to the wheel axis during inward spring strokes.

The inward spring stroke movement of the wheel axis therefore occurs in the direction of a shock produced upon a wheel by travelling over an irregularity, which movement is desirable for such axle suspension systems.

A disadvantage of this known axle suspension system lies in the fact that its instantaneous centre (swaying pole) is located far above the wheel axis. This is due to the fact that the bracing of the lateral forces is effected by the control arms articulated to the wheel brackets above the rigid axle body. This position of the instantaneous centre causes the wheel support points to be displaced to a high degree transversely to the longitudinal direction of the vehicle during alternate spring strokes. This has the result that, on an ice-smooth road, the wheels easily drift in the lateral direction and/or begin to float.

It is therefore an underlying object of the invention to provide an axle suspension system of the general type referred to above which is characterized by a substantially improved lateral wheel grip when on smooth ice. This object is achieved according to a preferred embodiment of the invention by providing guide arms means in the form of a pair of separate guide arms pivotally connected to fixed vehicle body parts at and to the rigid axle for defining the travel path of the rigid axle axis. The guide arms are arranged symmetrically with respect to the longitudinal median plane of the vehicle and extend obliquely towards the rigid axle such that their longitudinal axes intersect mutually substantially in the longitudinal median plane of the vehicle in a horizontal line located beneath the rigid axle or wheel axis.

In a preferred embodiment of the axle suspension system of the present invention, which is capable of oblique springing, the instantaneous centre is located beneath the wheel axis in that the intersection point of the longitudinal axes of the guiding arms (the straight joining lines passing through the bearing points of the two guide arms) lies in a plane beneath the wheel axis and is located upon the longitudinal median vehicle plane to determine the lateral control.

Such a displacement downwards of the instantaneous centre produces the advantage that the track curves, along which the wheel support points move during alternate inward and outward spring strokes, are given a steeper course, with the result that the strokes of the wheel support points relative to the road transversely to the longitudinal direction of the vehicle are reduced. This produces the desired improvement in the running behavior, namely better adhesion of the wheels on icy surfaces in the lateral direction.

Another advantageous further development of preferred embodiments of the invention is the provision of locating the guide arms in front of the rigid axle with the pivotal connections at the vehicle fixed body parts above the pivotal connections at the rigid axle, whereby a desirable slight understeering effect can be achieved elastokinematically by the influence of lateral forces.

Another favorable further development of preferred embodiments of the invention is the disposition of the guide arms so that their longitudinal axes intersect at the wheel support surfaces when in the design no load position, whereby the minimum lateral stagger distances of the wheels on icy surfaces can be achieved.

A further improvement in the running behavior in the sense of the invention can be achieved according to certain preferred embodiments by providing that the pivot axis about which the rigid axle moves is guided for straight movement in a substantially vertical plane, because then the pivot axis of the axle body is guided in a vertical plane perpendicular to the longitudinal direction of the vehicle during inward and outward spring stroke movements, and the axle body of the rigid axle will therefore execute no steering movements during alternate inward and outward spring stroke movements.

The straight guidance of the pivot axis of the rigid axle body may be achieved in this case by differently constructed control arm arrangements according to preferred embodiments of the present invention. Straight guides may be provided which are articulated to the rigid axle in its region near the wheel by only one control arm. The straight guidance may also be achieved by Watt linkages.

The axle suspension system constructed according to the invention is suitable for a rigid axle which exhibits driving or non-driving wheels. It may also be constructed as a front axle suspension means or as an axle suspension means with steerable wheels according to other contemplated embodiments.

In reference again to U.S. Pat. No. 2,226,047 the value of the pivot angle of the axle body and of its wheel brackets which produces the positive oblique springing is then determined by the length of the control arms and the interval of the wheel axis from the straight line joining the control arm articulation points to the rigid axle.

In this context, in order to achieve the track curve of the wheel axis which is required for a customary oblique springing of 3° to 6°, the length of the control arms to be provided beneath the wheel axis should be chosen greater than the length of the control arms to be arranged above the wheel axis.

However, this differentiation in the length of control arms results in the disadvantage that the axle body executes steering movements during one-sided and alternate-sided inward and outward spring strokes, and is additionally also subject to a torsional stress during one-sided inward and outward spring strokes.

It is consequently an underlying object of further preferred embodiment of the present invention to provide an axle suspension system or arrangement of the type discussed generally above, wherein the axle body remains free of steering movements and torsional stresses during one-sided and alternate-sided inward and outward spring strokes. This object is achieved according to preferred embodiments of the invention by providing a positive control system which avoids road shock, induced steering movements due to one-sided or alternative loading of the ends of the rigid axle.

In the axle suspension system according to the further preferred embodiments of the invention, the axle body is mounted pivotable about a guide pivot axis parallel to the wheel axis on straight guides formed by control arms and rocker arms. The guide pivot axis is guided by this straight guide ina vertical plane perpendicular to the longitudinal direction of the vehicle during inward and outward spring strokes. Steering movements of the axle body are accordingly avoided in this system with the positive oblique springing also discussed above.

The movement of the axle body which produces a positive oblique springing is then achieved by a further guide arm, in that the axle body is pivoted about the guide pivot axis by the latter in a direction opposite the forward travel direction during inward spring stoke movements, and in a direction opposite thereto during outward spring stroke movements.

The movement of the rigid axle during inward and outward strokes is therefore composed, in the construction according to the invention, of mutually superimposed partial movements, while one partial movement resides in the vertical displacement of the pivot axis and another partial movement is the pivot movement of the axle body about the pivot axis caused by the guide arm Further objects, features, and advantages of the present invention will become more apparent from the following description when taken with the accompanying drawing(s) which show, for purposes of illustration only, an embodiment/several embodiments in accordance with the present invention.

DETAILED DESCRIPTION OF THE DRAWINGS

Figure 1:
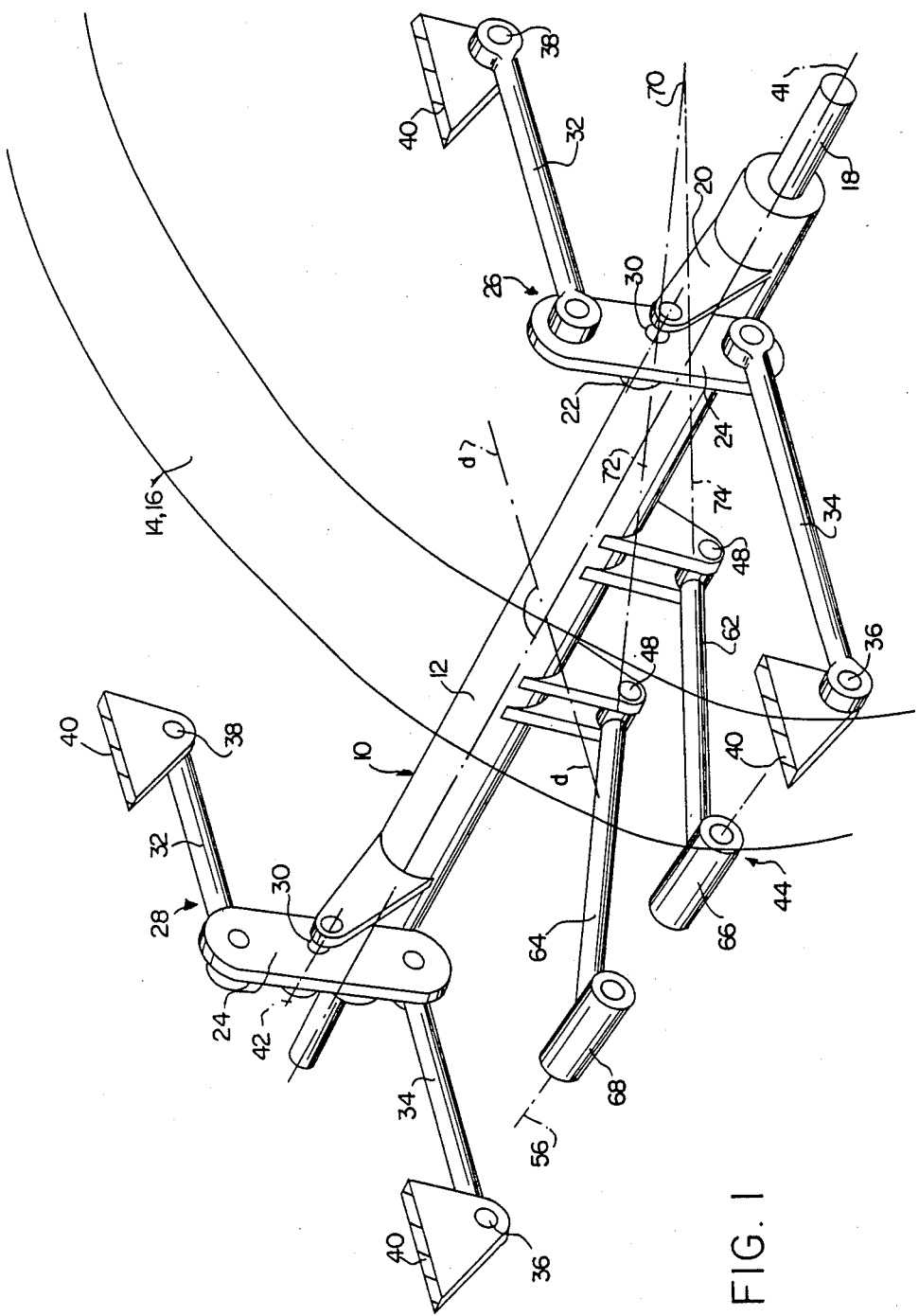
FIG. 1 is a perspective oblique schematic view of a vehicle rear axle suspension system constructed in accordance with a preferred embodiment of the present invention.

In FIG. 1 the reference numeral 10 generally designates a rigid axle, the tubular axle body 12 of which carries a journal 18 at each of its ends to mount vehicle wheels 14, 16. In the preferred illustrated embodiment, the rigid axle is a rear axle for a motor car.

Pairs of bearing support brackets 20, 22, between which a bearing bolt 30 supporting a rocker arm 24 of a Watt linkage 26 and 28 respectively is retained, are respectively arranged on the axle body 12 above a horizontal plane passing through the rigid axle or wheel axis 41. These bearing support brackets are disposed at the upper circumferential part of the axle body, in the regions near the wheels. The bearing bolts 30 are accordingly also located above the horizontal plane passing through the wheel axis 41.

In this exemplary embodiment the bearing support brackets 20, 22, considered in the forward travel direction of the vehicle, extend obliquely upwardly and forwardly. In this manner, the lower parts of the rocker arms 24 are located in front of the axle body 12, since these rocker arms 24 are mounted at the same radial interval from the wheel axis 41.

The guiding control arms 32 and 34 of the Watt linkages 26 and 28, which are articulated in the region of the upper and lower end of the rocker arms 24, extend substantially horizontally away therefrom in the design position and are located parallel to the longitudinal median vehicle axis. They are articulated to the vehicle body 40 at 36 and 38. Within the context of structural conditions, in accordance with other preferred embodiments, the control arms 32 and 34 could also be angled in the horizontal plane and obliquely to the longitudinal median vehicle plane, for example symmetrically to the latter in roof shape or V shape, because an accurate straight guidance is also ensured in that case.

Figure 2:
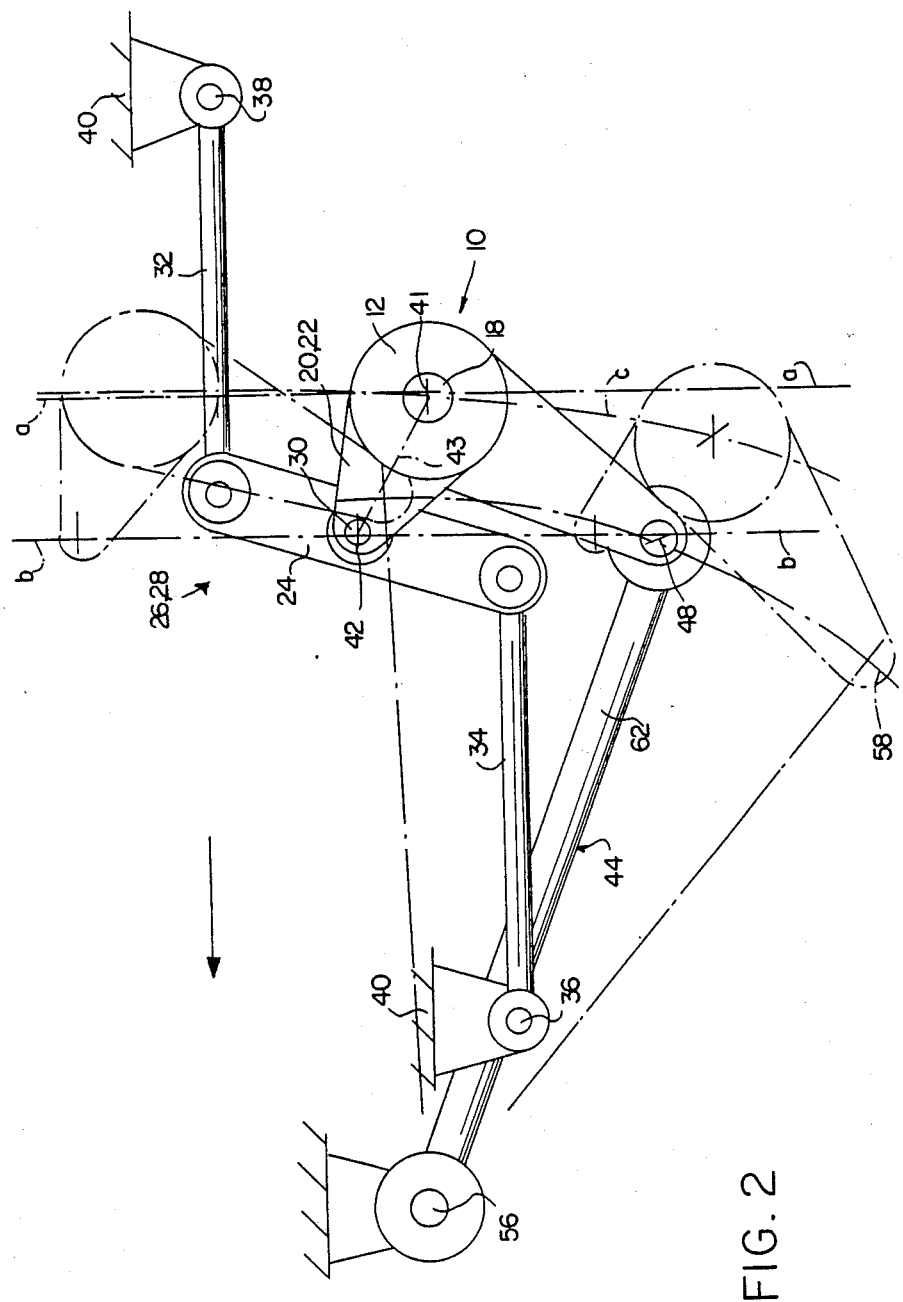
FIG. 2 is a schematic side view of the suspension system of FIG. 1, showing the same in the design position in solid lines, from which the position of its components, which serve for guidance, in an inward spring stroke and outward spring stroke position may also be seen as depicted in dash-dot lines.

The bearing bolts 30, disposed eccentrically with respect to the wheel axis 41, define a pivot axis 42 parallel to the wheel axis 41, about which the axle body 12 can oscillate. This is discussed further below. This horizontal pivot axis 42 is therefore located in front of a vertical transverse vehicle plane a—a passing through the wheel centres and extends perpendicularly to the longitudinal median vehicle plane d—d (FIG. 2). The pivot axis 42 is located above the wheel axis 41 in the exemplary preferred emobidment illustrated. Other embodiments are contemplated with the pivot axis 42 located below the wheel axis 41. Embodiments are also contemplated where the pivot axis 42 is located behind the vertical plane a—a.

In view of the fact that the upper guiding control arms 32 of the Watt linkages 26, 28 cross the axle body 12, a virtually vertical adjustment of the rocker arms 24 in the design position appears most advantageous under certain marginal conditions.

During two-sided, one-sided or alternate-sided inward and outward spring stroke movements of the axle body 12, the Watt linkages 26, 28 effect a bracing of the rigid axle 10 which is braced relative to the vehicle body by means of non guiding springs, and a guidance of the pivot axis 42 defined by the rocker arm bearing bolt 30 in a vertical plane b—b, so that the axle body 12 cannot execute any inherent steering movements during such movements.

A guide device which fulfills a plurality of purposes is generally designated 44. By means of the latter the axle body 12 is pivoted about the horizontal pivot axis 42 according to FIGS. 2 and 3 during one-sided or two-sided inward spring strokes, so that a straight line 43 joining the wheel axis 41 to the pivot axis 42 tends to be displaced towards the horizontal position. By this means, with an inward spring stroke movement of the rigid axle 10 in the direction of a shock acting upon one or both wheels 14, 16, a so-called positive oblique springing is achieved. Considered in the longitudinal direction of the vehicle, the guide device 44 is arranged in front of the rigid axle 10 and also assumes the lateral guidance of the rigid axle 10.

It is therefore ensured, by the suspension and guidance of the axle body 12 by means of the Watt linkages 26 and 28 and by the use of the guide device 44, that the rigid axle 10 will not execute any kinematically dictated inherent steering movements, even in the case of a desired oblique springing, in which the wheel axis 41 of the axle body 12 is required to move substantially along a flat curve c of FIG. 2 in the preferred illustrated embodiment.

In the FIG. 1 and 2 embodiments, the oblique positioning of the guide device 44, which may be seen from FIG. 2, has inter alia the effect, as already indicated above, that during inward and outward spring stroke movements and the movement of the pivot axis 42 defined by the bearing bolts 30 which then occurs in the vertical plane b—b, the articulation points 48 of the guide 44 to the axle body 12 move along a circular path 58 concentric with the pivot axis 56, which results in a pivoting of the axle body 12 counter clockwise about the pivot axis 42 parallel to its longitudinal axis and wheel axis 41 during inward spring stroke movements.

The axle body 12 is therefore pivoted counter to the forward travel direction indicated by an arrow in FIG. 2, or backwards and upwards, whilst due to the mutually superimposed movements of the pivot axis 42 in the vertical plane b—b and of the articulation points 48 along the circular path 58, the wheel axis 41 of the axle body 12 is displaced, both during one-sided and two-sided inward and outward spring strokes, parallel to itself approximately along the curve c (FIG. 2) and at the same time in plan in a position in space perpendicular to the longitudinal median vehicle plane d—d.

The bearing bolts 30 of the rocker arms 24 should be provided on the axle body 12 so that moments which act upon the axle body 12 during acceleration and braking are braced by the guiding control arms 32, 34 of the Watt linkages 26, 28, and also the pivoting movement of the axle body 12 about the pivot axis 42 which is necessary for a desired oblique springing can occur through the guide device 44.

Therefore the bearing bolts 30 should not be located in a horizontal plane passing through the wheel axis 41. The position of the instantaneous centre of the rigid axle 10 is further determined by the guide device 44. For this purpose the guide device 44 exhibits two guide arms 62, 64 articulated to the axle body 12 beneath the wheel axis 41 at a symmetrical spacing from the longitudinal median vehicle plane d—d. Arms 62 and 64 diverge towards their pivot bearings 66, 68 on the vehicle body which pivot bearings 66, 68 are preferably located above a horizontal plane passing through the wheel axis 41.

This construction makes it possible to maintain the position of the instantaneous centre beneath the rigid axle 10. Good holding of the wheels 14, 16 against lateral drifting (floating) on icy surfaces is thereby achieved.

Optimum facility for travel straight ahead on icy surfaces is achieved if the instantaneous centre is located in the wheel support plane, because in this case the track curve of the wheel support points is steepest.

Considered in the longitudinal direction of the vehicle, the guide device 44 may also be arranged behind the rigid axle according to other preferred embodiments of the invention, whilst in this case the articulation point of the guide arms to the vehihcle body should be provided beneath their articulation point to the rigid axle and the guide arms diverge towards the rigid axle.

It is demonstrated below with reference to FIGS. 3 to 6, what advantageous installation possibilities are available for the guide arms 62 and 64 of the guide device 44 in the case of such a construction of the latter.

The properties of the rigid axle, such as toe-in, camber, small lateral stagger of the wheel support points, starting compensation, braking compensation, control of lateral forces and the position of the instantaneous centre are then still largely retained if the position of the guide arms 62 and 64 of the guide device 44 relative to the rigid axle 10 according to FIG. 3 and 4, for example, is modified according to a further proposal of the invention, as explained below.

Any modification of the position of the guide arms 62 and 64 should be made symmetrically in the lateral direction to the longitudinal median vehicle plane d—d, as the straight lines 72 and 74 joining the articulations starting and radiating from its intersection point 70 show. That is to say, the guide arms 62 and 64 should be displaced by equal distances in mutually opposite directions referred to the longitudinal median vehicle plane d—d in a transverse vehicle plane e—e parallel to the wheel axis 41, whilst this displacement should be made in a plane defined by the bearing points of the pivot bearing 66 and 68 and the intersection point 70. In FIGS. 3 and 4, the reference characters with Postscripts "A", "B" depict alternative positions for the guide arms and their pivot connections.

Therefore, in every possible arm arrangement, the control arm bearings on the vehicle body and on the axle should be provided at an equal interval f or g from the wheel axis 41 and at an equal interval h or i from the wheel support surface 76. Accordingly the side elevation of the guide device 60 remains unchanged for every possible arm arrangement according to this proposal.

Figure 3:
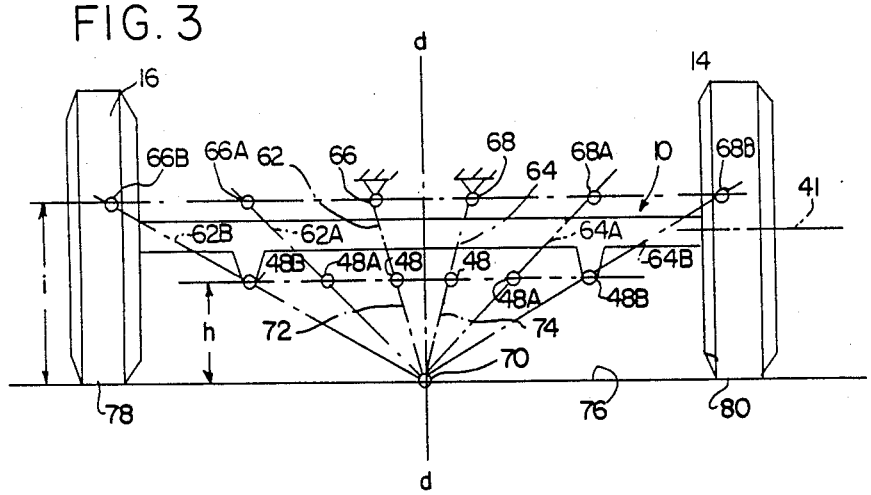
FIG. 3 is a rear elevation schematic view of the rigid axle of the rear axle suspension means of FIG. 1, illustrating a first preferred arrangement of the two control arms of a guide device determining the position of the instantaneous centre in solid lines and with the representation of further alternative positions of the axle guiding control arms only schematically shown in dash-dot lines.
Figure 4:
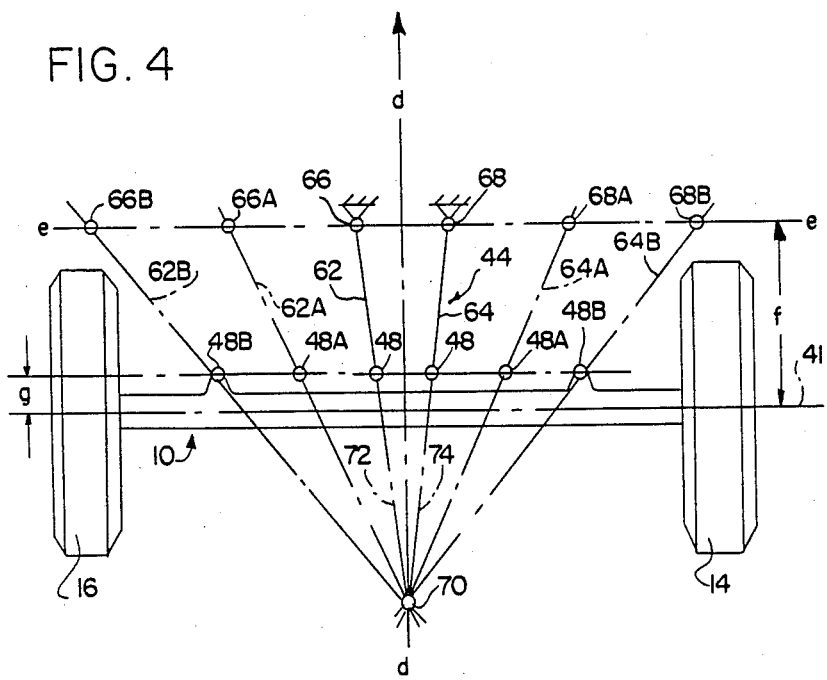
FIG. 4 is a schematic view of the rigid axle suspension system constructed in accordance with a further embodiment having different arrangements of the two control arms of the guide device, when the representation of further axle guiding control arm positions being likewise shown in dash-dot lines.

The particular advantages of an axle suspension system according to FIG. 3 and 4 may be seen in the fact that the guide arms 62 and 64 can be accommodated on the chassis of a vehicle body as existing space conditions permit. Furthermore, with the position of the instantaneous centre in the wheel support plane, very short and almost symmetrical strokes of the wheel support points 78, 80 relative to the road in the lateral direction of the wheels during alternate spring strokes, and therefore excellent straight running facilities on icy surfaces can be achieved. Moreover, due to the intersection point 70 of the guide arms 62, 64 located behind the axle, an elastokinematically desirable slight understeering effect is achieved under the influence of lateral forces.

Figure 5:
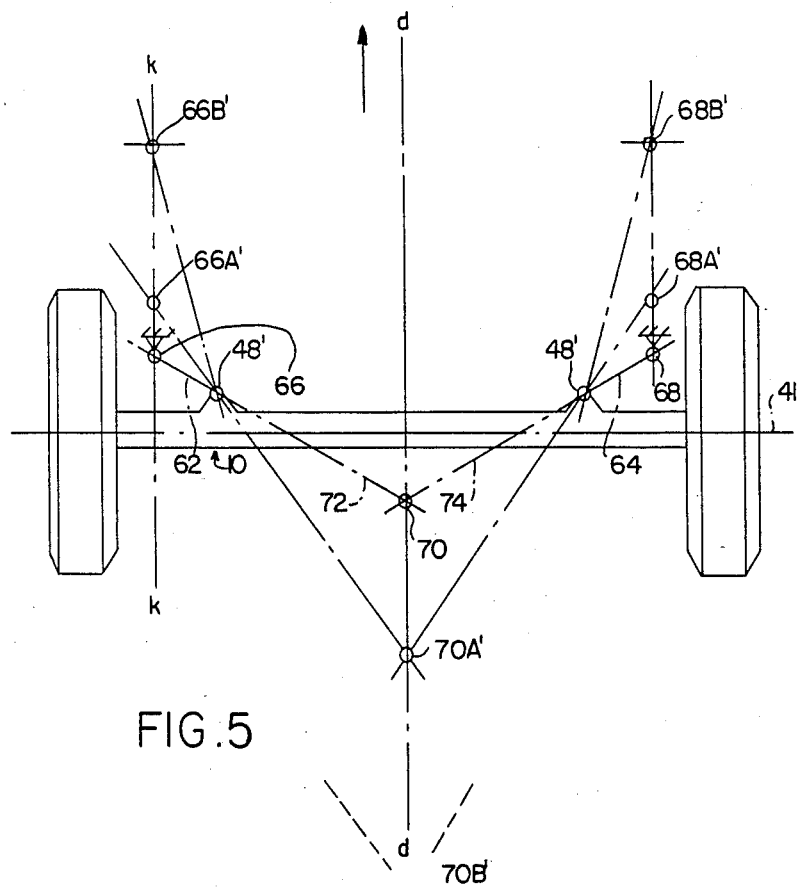
FIG. 5 is a plan schematic view, similar to FIG. A, of a rigid axle suspension system constructed in accordance with a further embodiment having different arrangements of the two control arms with the further positions of the control arm shown in dot-dash lines.
Figure 6:
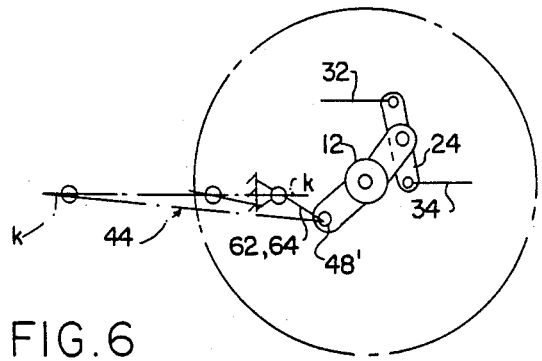
FIG. 6 is a schematic side elevation view of the rigid axle system of FIG. 5.

FIGS. 5 and 6 illustrate a further possible arm arrangement of the guide device 44 according to FIG. 1, which may likewise find advantageous application particularly under constricted space conditions, and which furthermore presents the similar advantages already explained.

According to this proposal of FIGS. 5 and 6 (postscripts A and B depict alternative positions of posts), the guide arms 62' and 64', for every possible arrangement relative to the rigid axle 10, are articulated to its axle body 12 in the same position 48' beneath the wheel axis 41 in each case (see FIG. 5). In plan and in side elevation, on the other hand, in order to maintain a toe-in, camber, lateral stagger of the wheel support points and height of the instantaneous centre virtually invariable, the arrangement of the guide arms is preferably made so that they radiate outwards towards their arm bearings 66' or 68' respectively remote from the rigid axle 10, starting from their point of articulation to the rigid axle 10.

Then, in this case, in spite of a modified arrangement of the guide arms, the rear elevation of the guide device 44 remains the same. However, the starting compensation, braking compensation and the control of lateral forces then undergoes slight modifications. This is due to the fact that in the possible different arrangements of the guide arms, as FIG. 5 shows, their intersection point 70 is displaced correspondingly along the longitudinal median vehicle plane d—d towards the rear of the vehicle, whereas this remains constant on the longitudinal median vehicle plane d—d in the case of the arm arrangement according to FIGS. 3 and 4.

Due to the arm arrangements according to FIGS. 3 to 6 which are practicable for a construction of the guide device 44 according to FIG. 1, it is therefore possible to achieve axle kinematic properties in combination with a rigid axle, such as are known only in the case of highly technically developed individual wheel suspensions. FIG. 6 shows an alternative arrangement of the guiding control arms 32, 34 to FIG. 1.

Figure 7:
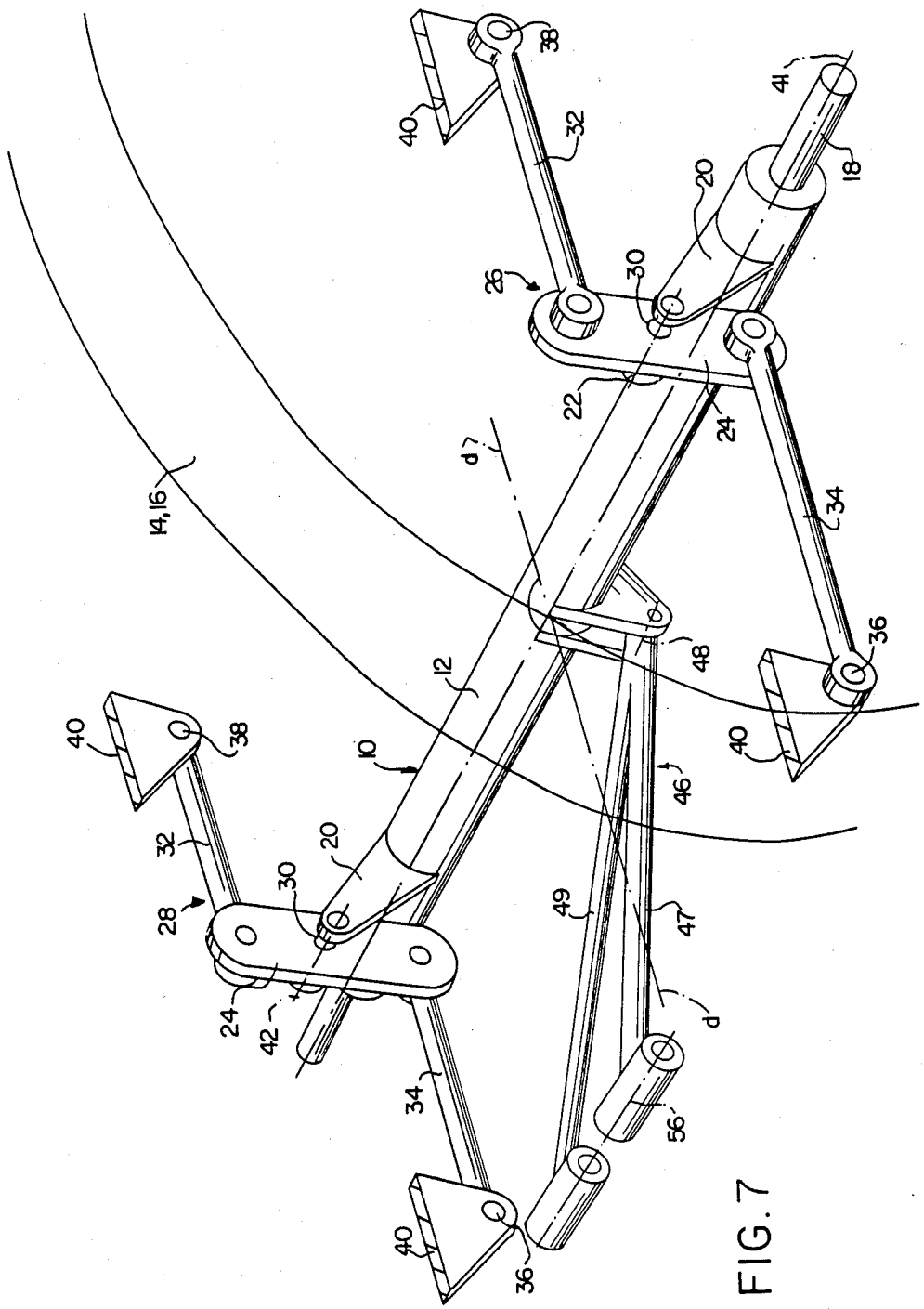
FIG. 7 is a schematic perspective oblique view from above of a rear axle suspension system constructed in accordance with a further preferred embodiment of the present invention.

In FIG. 7, like parts are given like reference numerals to those shown in the embodiment of FIG. 1. The embodiment of FIG. 7 differs in the construction and linkage of the guide arm means, designated in FIG. 7 as 46. The following is a detailed description of this embodiment.

Figure 8:
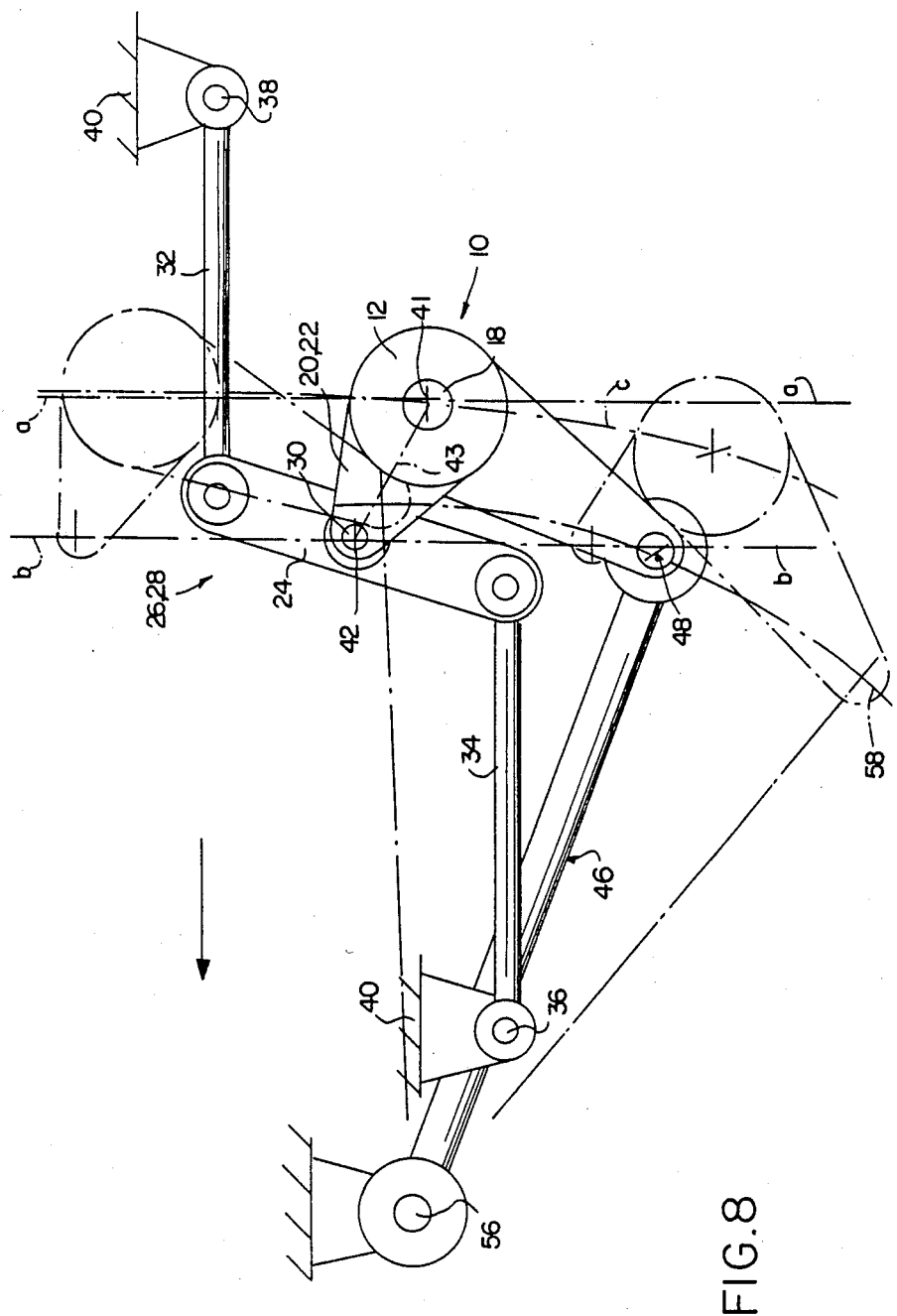
FIG. 8 is a side elevation schematic view of the rear axle suspension of FIG. 7, showing the same in the design position in solid lines and depicting parts in dash-dot lines for respective positions after inward and outward spring stroke movements.

In the embodiment of FIG. 7, the reference numeral 46 designates generally a guide arm, by means of which the axle body 12 is pivotable about the horizontal pivot axis 42 according to FIGS. 7 and 8, during an inward spring stroke, so that a connecting straight line 43 joining the wheel axis 41 to the pivot axis 42 tends to a displacement towards the horizontal position. With this arrangement a so-called positive oblique springing is achieved during an inward spring stroke movement of the rigid axle 10 in the direction of a shock acting upon one or both wheels.

Advantageously, the guide arm 46 simultaneously performs the lateral guidance of the rigid axle 10 and accordingly, in the exemplary embodiment according to FIGS. 1 and 2, also forms a lateral guide member in the fashion of a wishbone known per se. The latter is articulated universally at 48 by its pointed end in the center of the length of the axle body 12, particularly beneath its wheel axis 41, whereas its two members 47 and 49 diverge mutually from the articulation point 48 and are mounted pivotable by their free ends on the vehicle body 40 at an interval in front of the pivot axis 42, considered in the longitudinal travel direction of the vehicle for pivotal movement about a pivot axis 56 parallel to the pivot axis 42. In this case the articulation point 48 to the rigid axle is located lower than the pivot axis 56 attached to the vehicle body.

It is therefore ensured, by the suspension and guidance of the axle body 12 by means of the Watt linkages 26 and 28, and also by the use of the guide arm 46, that the rigid axle 10 will not execute any kinematically dictated inherent steering movements, even in the case of a desired oblique springing, in which the longitudinal axis of the axle body 12 is required to move substantially along a flat curve c of FIG. 2, for example.

In this case the oblique position of the wishbone 46, which may be seen from FIG. 8, has the effect, as already indicated above, that during the inward and outward spring strokes and the concomitant movement of the pivot axis 42 defined by the bearing bolts 30 along the vertical plane b—b, the articulation point 48 to the axle body moves along a circular path 58 concentric to the pivot axis 56, whereby a pivoting of the axle body 12 counterclockwise about the pivot axis 42 parallel to its longitudinal axis results during inward spring strokes.

The axle body 12 is therefore pivoted counter to the forward travel direction indicated by an arrow in FIG. 2, or backwards and upwards, while due to the mutually superimposed movements of the pivot axis 42 along the vertical plane b—b and of the articulation point 48 along the circular path 58, the longitudinal axis of the axle body 12 or the wheel axis 41 will be displaced in space parallel to itself approximately along the curve c (FIG. 8), and at the same time in plan in a position perpendicular to the longitudinal median vehicle plane d—d, both during one-sided and two-sided inward and outward spring strokes.

The bearing bolts 30 of the rocker arms 24 are advantageously provided on the axle body 12 so that not only can movements acting upon the axle body 12 during acceleration and braking be braced by the control arms 32, 34 of the Watt linkages 26, 28, but also the pivoting movement of the axle body 12 about the pivot axis 42, which is necessary for a desired oblique springing, can occur by means of the guide device 46.

The bearing bolts 30 may therefore not lie in a horizontal plane passing through the wheel axis 41. In this case the instantaneous center of the rigid axle 10 is determined simultaneously by the articulation point 48 forming the intersection of the members 47, 49.

In the described axle suspension system with a nonsteering rigid axle, the kinematic characteristics of the rigid axle, such as toe-in, camber, starting compensation, braking compensation, lateral force control and the position of the instantaneous center of the rigid axle remain substantially unchanged.

The axle suspension means according to the preferred contemplated embodiments of the invention is suitable for a rigid axle which exhibits driving or non-driving wheels. At the same time it may also be constructed as a front axle suspension means or as axle suspension means with steerable wheels, according to certain preferred embodiments.

Although the invention has been described and illustrated in detail, it is to be clearly understood that the above is to be taken by way of illustration and example only and not by way of limitation. The spirit and scope of the invention are to be limited only by the terms of the appended claims.

What is claimed is:

1. Axle suspension arrangement for supporting a rigid axle on a vehicle, comprising:
   guide control means supportingly engageable with the rigid axle for guiding the movement of the rigid axle axis about a guide control pivot axis during springing movement of the rigid axle with respect to a relatively fixed vehicle body,
   and additional guide arm means interposed between the rigid axle and the vehicle body for controlling movement of the rigid axle,
   said guide control means and additional guide arm means guiding movement of the rigid axle to effect positive oblique upward and rearward movements of the rigid axle axis in response to upward springing movements of the rigid axle,
   wherein the guide control means includes first and second guide control arm arrangements disposed at opposite lateral sides of the additional guide arm means,
   wherein each of said first and second guide control arm arrangements includes a rocker arm pivotally attached to the rigid axle and a pair of guide arms pivotally connected to the rocker arm at opposite sides of its pivotal attachment to the rigid axle, said guide arms having their ends opposite the rocker arms pivotally attached to respective fixed vehicle body.

2. An arrangement according to claim 1, wherein said additional guide arm means includes first and second mutually separate guide arms pivotally connected to the vehicle body, said first and second guide arms being arranged substantially symmetrically with respect to a plane extending longitudinally of the vehicle between the vehicle wheels and extending obliquely towards the rigid axle such that the longitudinal axes intersect the longitudinally extending vehicle plane in a point located beneath the rigid axle axis.

3. An arrangement according to claim 2, wherein the first and second guide arms are located in front of the rigid axle during normal forward driving of the vehicle, said first and second guide arms being pivotally connected to the vehicle body above their respective points of pivotal connection to the rigid axle and converge towards the rigid axle.

4. An arrangement according to claim 3, wherein the longitudinal axes joining the pivotal connections of the guide arms intersect on the wheel support surface.

5. An arrangement according to claim 2 wherein the longitudinal axes joining the pivotal connections of the guide arms intersect on the wheel support surface.

6. An arrangement according to claim 1, wherein the rigid axle pivot axis is guided via the guide control means in a vertical plane forming a straight guide path.

7. An arrangement according to claim 1, wherein the rocker arms are pivotally attached to the rigid axle in front of and above a horizontal plane through the rigid axle axis when in the normal operating position on a forwardly moving vehicle.

8. An arrangement according to claim 1, wherein the additional guide arm means extends forwardly from the rigid axle to the vehicle body part means when in the normal operating position on a forwardly moving vehicle.

9. An arrangement according to claim 1, wherein the additional guide arm means simultaneously forms lateral guide control of the rigid axle.

10. An arrangement according to claim 1, wherein the additonal guide arm means is formed with a wishbone shape, the apex of the wishbone being pivotally connected with the rigid axle substantially in the vehicle longitudinally extending plane extending transverse to the rigid axle.

11. An arrangement according to claim 12, wherein said rocker arms are symmetrically disposed at opposite sides of the apex.

12. An arrangement according to claim 1, including means for preventing inherent steering movements during non-symmetrical application of springing movement force, along the length of the rigid axle.

* * * * *